US010296744B1

(12) United States Patent
McGrew et al.

(10) Patent No.: US 10,296,744 B1
(45) Date of Patent: May 21, 2019

(54) ESCALATED INSPECTION OF TRAFFIC VIA SDN

(71) Applicant: Cisco Technology, Inc., San Jose, CA (US)

(72) Inventors: David McGrew, Poolesville, MD (US); Kenneth S. Beck, Morgan Hill, CA (US); Jyoti Verma, Saratoga, CA (US); Jason R. Brvenik, Ellicott City, MD (US)

(73) Assignee: Cisco Technology, Inc., San Jose, CA (US)

( * ) Notice: Subject to any disclaimer, the term of this patent is extended or adjusted under 35 U.S.C. 154(b) by 389 days.

(21) Appl. No.: 14/864,116

(22) Filed: Sep. 24, 2015

(51) Int. Cl.
G06F 21/56 (2013.01)

(52) U.S. Cl.
CPC .................................. G06F 21/566 (2013.01)

(58) Field of Classification Search
CPC ......................................................... G06F 21/566
USPC ............................................................. 726/23
See application file for complete search history.

(56) References Cited

U.S. PATENT DOCUMENTS

| 9,038,151 B1* | 5/2015 | Chua | H04L 45/02 709/223 |
| 9,363,282 B1* | 6/2016 | Yu | H04L 63/1425 |
| 9,628,285 B2* | 4/2017 | Csaszar | H04L 12/1863 |
| 9,736,185 B1* | 8/2017 | Belamaric | H04L 63/20 |
| 2008/0196104 A1* | 8/2008 | Tuvell | H04L 51/12 726/24 |
| 2013/0311675 A1* | 11/2013 | Kancherla | H04L 43/026 709/244 |
| 2015/0150079 A1* | 5/2015 | Hyatt | H04L 43/045 726/1 |
| 2015/0195197 A1 | 7/2015 | Yong et al. | |
| 2015/0304355 A1* | 10/2015 | Voit | H04L 63/20 726/1 |
| 2016/0036837 A1* | 2/2016 | Jain | H04L 63/1416 726/23 |
| 2016/0065601 A1* | 3/2016 | Gong | G06F 21/561 726/23 |
| 2016/0205071 A1* | 7/2016 | Cooper | H04L 12/6418 726/1 |
| 2016/0234234 A1* | 8/2016 | McGrew | H04L 63/1425 |
| 2016/0285722 A1* | 9/2016 | Min | H04L 43/0876 |

* cited by examiner

Primary Examiner — Jason K Gee
Assistant Examiner — Dereena T Cattungal
(74) Attorney, Agent, or Firm — Edell, Shapiro & Finnan, LLC

(57) ABSTRACT

A method and related apparatus for performing inspection of flows within a software defined network includes monitoring an indicator indicative of a presence of malware in a selected flow in an electronic communications network, when the indicator suggests the presence of malware in the selected flow, requesting a network device to redirect the selected flow, or to copy the selected flow and send a resulting copy of the selected flow, to a security appliance, and causing the security appliance to be reconfigured in response to the indicator that suggest the presence of malware in the selected flow.

20 Claims, 7 Drawing Sheets

ESCALATED INSPECTION OF TRAFFIC VIA SDN

TECHNICAL FIELD

Embodiments described herein relate to operations of a software defined network.

BACKGROUND

Software-defined networking (SDN) is an approach to computer networking that allows network administrators to manage network services through abstraction of lower-level functionality. This is done by decoupling the system that makes decisions about where traffic is sent (the control plane) from the underlying systems that forward traffic to the selected destination (the data plane).

A security device or appliance, such as, e.g., an intrusion detection system (IDS), is a device or software application that monitors network or system activities for malicious activities or policy violations and produces reports to a management station. IDSs come in a variety of "flavors" and approach the goal of detecting suspicious traffic in different ways. Some systems may attempt to stop an intrusion attempt but this is neither required nor expected of a monitoring system. Thus, IDSs are primarily focused on identifying possible incidents, logging information about them, and reporting and/or notification functionalities.

DESCRIPTION OF EXAMPLE EMBODIMENTS

Overview

Figure 1:
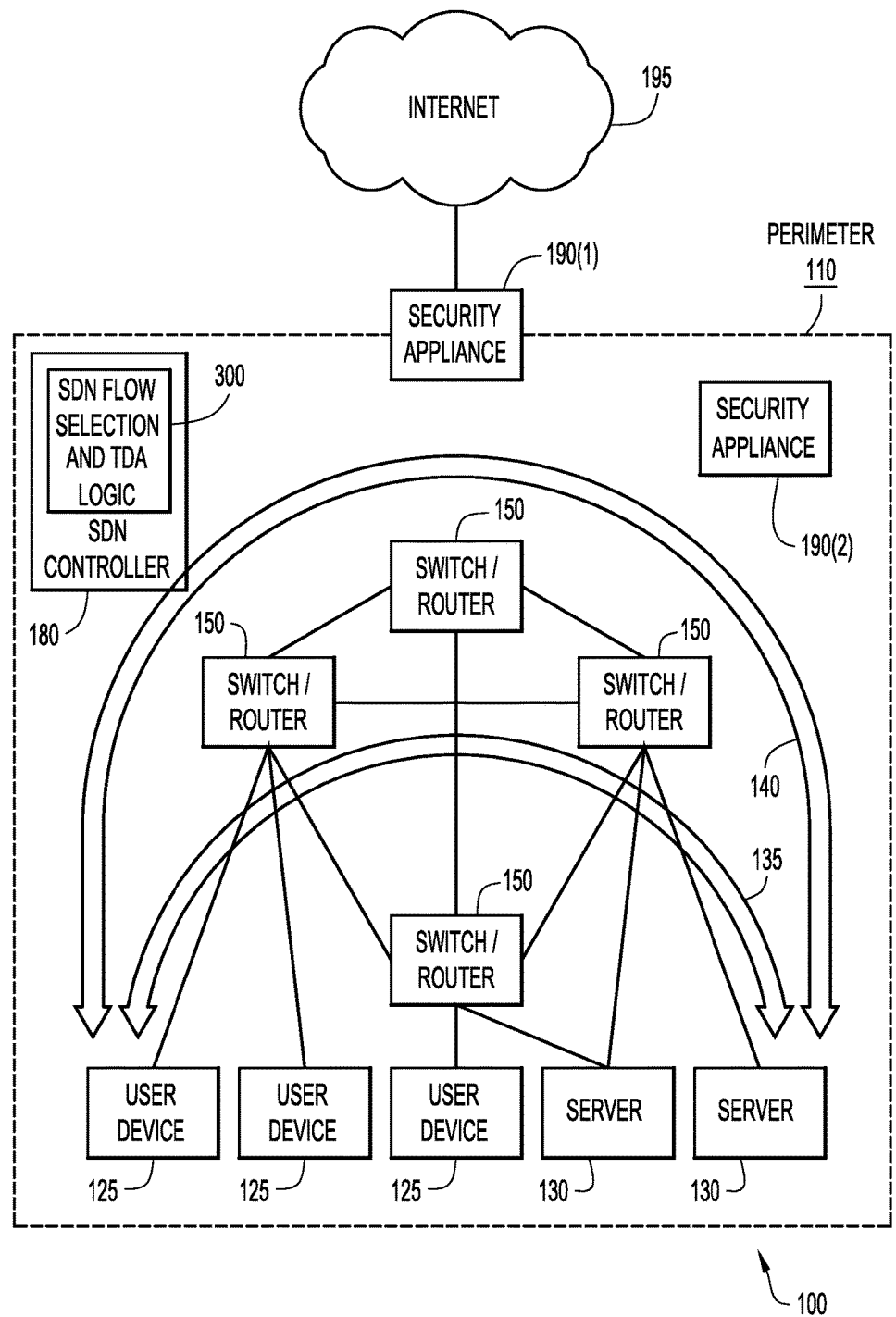
FIG. 1 is a block diagram of components that may be employed to implement traffic inspection in a software defined network according to an example embodiment.

A method and related apparatus for performing inspection of flows within a software defined network is described. The methodology includes monitoring one or more indicators indicative of a presence of malware in a selected flow in a network, when the indicators suggest the presence of malware in the selected flow, requesting a network device to redirect the selected flow, or to copy the selected flow and send a resulting copy of the selected flow, to a security appliance, and causing the security appliance to be reconfigured in response to the indicators when the indicators suggest the presence of malware in the selected flow.

Example Embodiments

In the following description, the terms "traffic," "flow" and "traffic flow" are used interchangeably, and are meant to encompass data communications passing through an electronic communications network between any two endpoints. Most "east-west" traffic on internal networks, i.e., internal traffic, is not inspected by a security device or appliance such as an Intrusion Detection System (IDS) or Firewall, due to the overhead of security inspection. It can be too costly to put an IDS everywhere. Instead, it is commonplace to deploy an IDS or Firewall between a set of trusted devices and a larger network, e.g., between a datacenter and the Internet. Such a deployment is sometimes referred to as a perimeter deployment. However, malware can nevertheless make its way onto a trusted network, and can thereafter perform reconnaissance, marshal data to be exfiltrated, propagate itself, and conduct other mischief. Thus, there is a strong need to inspect traffic to detect malware infected devices, yet traffic behind a security appliance can often go wholly uninspected.

Perimeter devices aim to detect malware communication that traverses the security perimeter, but they are not always successful. This is because the malware communication may be sufficiently hard to detect, or because the malware infection propagates and communicates through some other means, such as via removable media, multihoming (e.g., malware can communicate to its command and control server when it is a remote network access point, e.g., a coffee shop, but not when it is on the corporate network), or "spear phishing" by targeting individuals with email designed to get them to click a link to a malware source. Thus, the embodiments described herein provide additional means of detecting malware that has successfully founds its way onto a trusted network.

In accordance with one embodiment, malware detection leverages capabilities of a software defined network. As will be described in more detail herein below, to detect malware in a SDN-enabled network, selected traffic, which would otherwise go uninspected, is sampled, and the SDN is used to (re)route or copy the sampled traffic to an inspection device. The sampling process can be configured such that communication from each endpoint is inspected at some time, thus making it probable that malware infections can be detected.

Thus, in accordance with an embodiment, SDN enables traffic that would normally go uninspected to be routed through an inspection device. Specifically, the SDN can be configured to enable the inspection of particular traffic by redirecting or copying the traffic, and forwarding the same to an inspection device. In a typical network, there is much traffic that normally bypasses inspection due to the network topology and because, often times, there is just too much traffic to inspect it all. That is, it is impractical (if not impossible) to route or copy all of the traffic to an inspection device because of bandwidth constraints, and the computational cost of inspecting all of the traffic may be prohibitive.

Embodiments described herein address the forgoing by sampling traffic (sometimes randomly or arbitrarily), then routing that traffic to an inspection service (i.e., a security appliance), such as an IDS device. Alternatively, the traffic to be sampled is copied and a resulting copy of the traffic is forwarded to the inspection device. In one possible implementation, a random process is used to select traffic for inspection, and when traffic is selected, it is inspected for some period of time. When that period ends, other traffic is selected.

The embodiments described herein are effective at detecting a device that is infected with malware because the random sampling process makes it likely that some malware communication from an infected device will be inspected at some point. While it might be true that much malware communication might go uninspected, due to the random nature of the sampling, eventually such traffic will be sampled and detection will occur.

The described approach takes advantage of an SDN controller's topological and endpoint session awareness, when available, for targeting. That is, traffic or flows can be targeted, rather than randomly or arbitrarily selected. Examples of target selectors include: Internet Protocol (IP) address, layer 2 address, email address, network tuple, user, destination geographic area, and application type. As another example, new flows from one switch port to another switch port could be targeted for inspection.

In addition, the sampling process can be weighted to traffic considered more likely to contain threats. For instance, sampled traffic can be selected based on targets an attacker might be more likely to be interested in. In this regard, a risk-factor and a value of the data being accessed can also be considered, as can a destination of the data. Additionally, a threat defense application or an administrator can indicate which hosts deserve heightened interest for targeting for inspection by indicating the priority of each host. Alternatively, a policy system that identifies which devices might be more sensitive (e.g., TrustSec security groups) can be leveraged for information about sensitive devices.

The traffic can be sent either inline (redirected) or out-of-line using, e.g., a switch port analyzer (SPAN) to obtain a copy of the traffic. In either case, the ability of the SDN to route traffic through specific hops is used to get the traffic to the inspection service.

The mechanism used to program the network devices to effect the redirection or copying can be any programmatic interface such as "North Bound" APIs to a network controller or directly to device APIs depending upon the capabilities and policies of the network. The application performing the selection can be housed anywhere in the network where appropriate processing and memory capabilities are available, such as within an SDN controller itself, on a blade or server in a datacenter, a blade in a network device, the Control Plane of a Firewall, etc. depending upon the nature of the API used, device capability and network or security policy.

In addition, once a given flow is selected for inspection, it is possible in accordance with the embodiments described herein to further monitor "indicators" indicative of the presence of malware in the selected flow. When such indicators suggest the presence of malware in the selected flow, the security appliance may be caused to be reconfigured to, e.g., perform more in-depth analysis of the selected flow, and/or to, e.g., inspect still other flows. This change in inspection may be considered an "escalation" resulting from interpretation of the monitored indicators. Such indicators might include, but are not limited to, a SQL injection attempt, server logs, a current event, a human resource event, an industry compliance factor or a user request.

Reference is now made to FIG. 1, which depicts a block diagram of components that may be employed to implement traffic inspection in a software defined network according to an example embodiment. As shown, a network topology 100 within a defined perimeter 110 comprises a plurality of user devices 125, including, e.g., computers, laptops, wireless devices, or any end user computing device that can connect with a network. Network topology 100 further includes servers 130, which can host any number of applications, databases, web servers or other computing functionality that might be of interest to any given user device 125.

Also included within network topology 100 are a plurality of switches or routers (switches/routers) 150 that are configured to enable data or communications traffic to flow between a given user device 125 and a given server 130. Such data or communication traffic is depicted by double headed arrow 135.

In addition to the foregoing components, also provided is a security appliance 190(1) that is disposed at perimeter 110 and is configured to monitor "north-south" data traffic coming from and going to the Internet 195. Security appliance 190(2) may be a separate security appliance that may be dedicated to operate in accordance with embodiments described herein. Security appliances 190(1), 190(2) (hereinafter "190", shown in FIG. 2) may be intrusion detection systems or any other data/communications monitoring device or system that can analyze data traffic and identify malware or other suspicious activity. In addition, security appliance 190 may be a "virtual" appliance, e.g., software that can be run on a general-purpose computer that enables it to emulate a dedicated hardware appliance.

In accordance with embodiments described herein, network topology 100 may be controlled by SDN controller 180, which is in communication with, e.g., switches/routers 150 to set up and tear down communication paths between a given user device 125 and a given host 130. In the implementation depicted in FIG. 1, SDN controller 180 hosts SDN flow selection and threat detection application (TDA) logic 300, the features of which are described in detail in connection with FIGS. 3-6. At a high level, SDN flow selection and TDA logic 300 is responsible for selecting a given data flow for sampling, effecting either a redirection of the selected flow or a copying of the selected flow, causing the redirected flow or copy of the selected flow to be forwarded to security appliance (also referred to as "service") 190 for analysis, and/or escalating inspection of a given flow or causing additional flows to be inspected.

Figure 2:
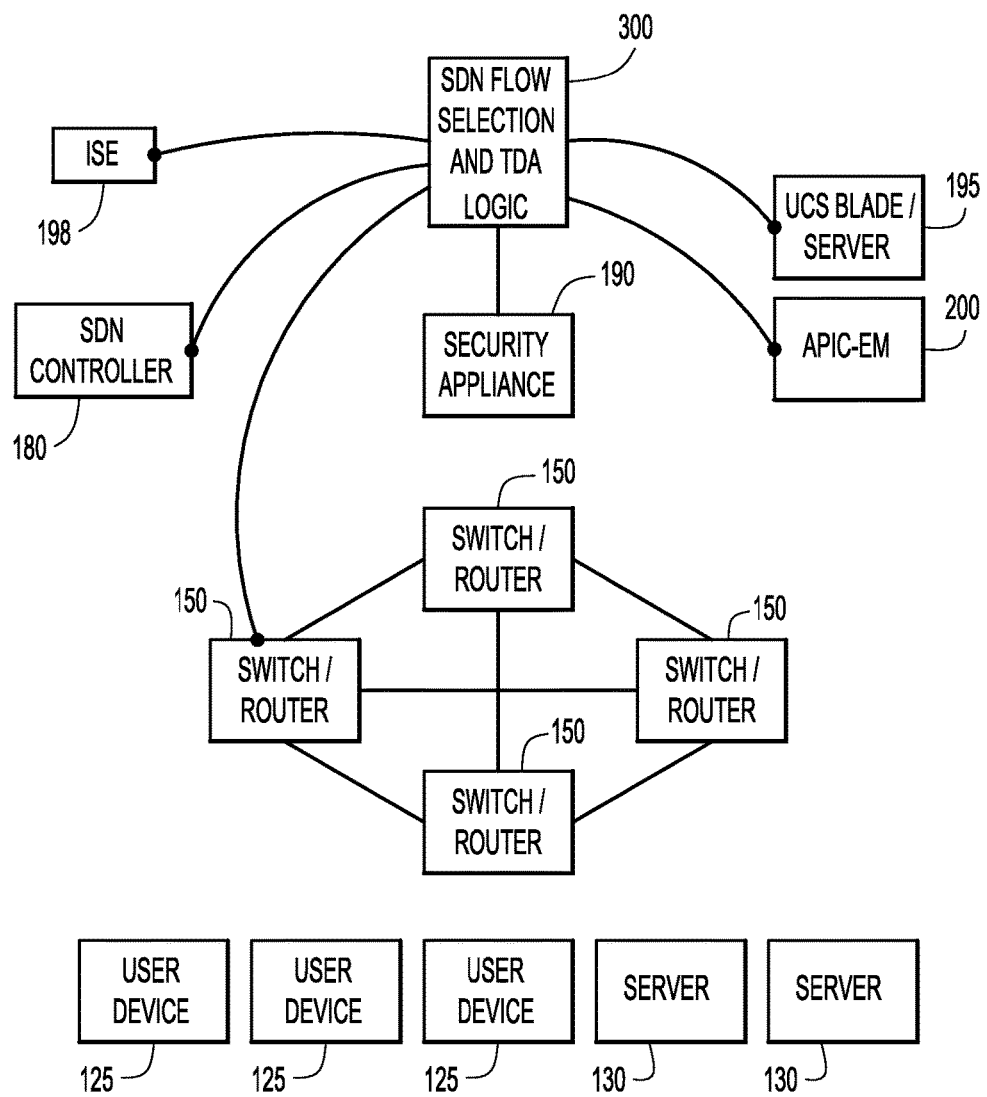
FIG. 2 depicts several locations within a network on which SDN flow selection and threat detection application (TDA) logic may be hosted according to an example embodiment.

Although FIG. 1 depicts SDN flow selection and TDA logic 300 being hosted by SDN controller 180, SDN flow selection and TDA logic 300 can be hosted in any of a number of locations or even distributed among such locations. More specifically, FIG. 2 depicts several locations within a network on which SDN flow selection and TDA logic 300 may be hosted according to an example embodiment. As shown, SDN flow selection and TDA logic 300 can be hosted on switches/routers 150, an Identity Services Engine (ISE) 198 (available from Cisco, Inc., San Jose Calif.), a unified communications system blade or server 195, or even on a dedicated device such as an Application Policy Infrastructure Controller Enterprise Module (APIC-EM) 200 (available from Cisco, Inc., San Jose Calif.), or distributed across such components. Another possible host might be a Security Information and Event Management (SIEM) system (not shown).

Figure 3:
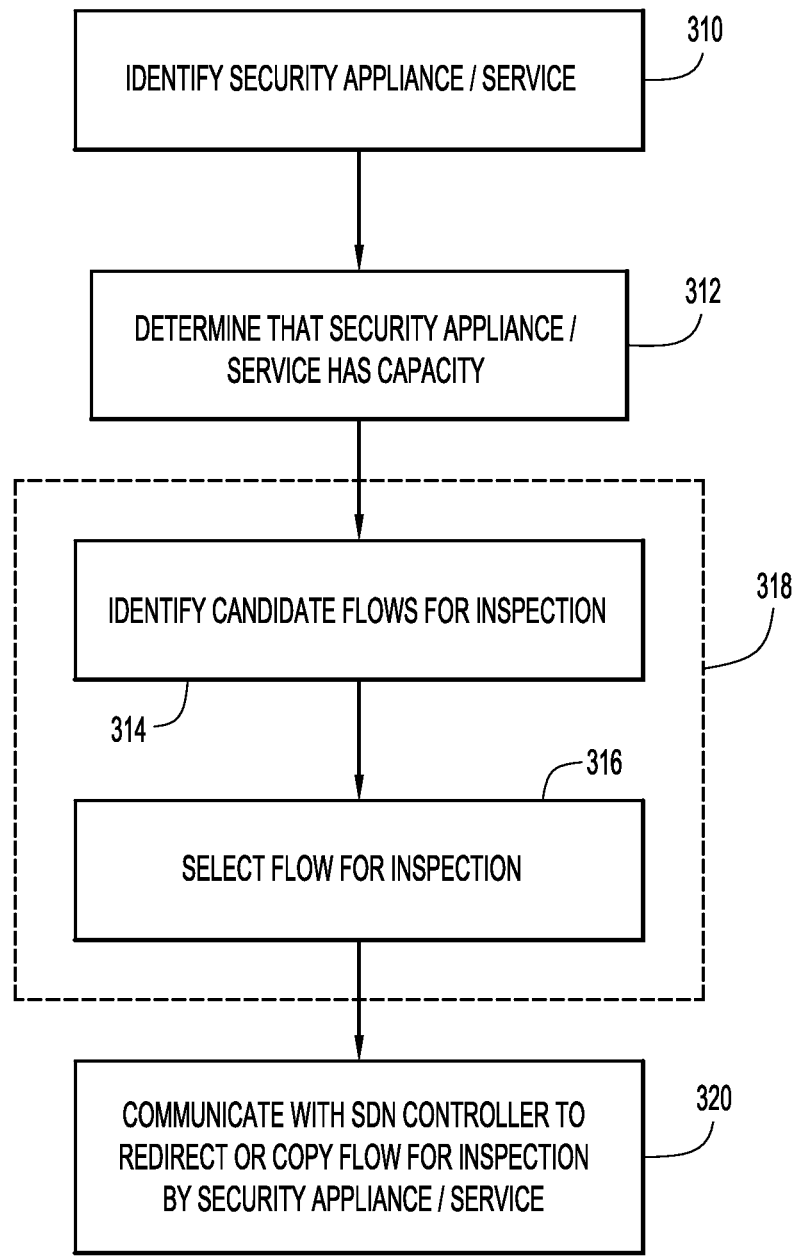
FIG. 3 is an example flow chart depicting a series of operations for performing traffic inspection in a software defined network according to an example embodiment.

FIG. 3 is an example flow chart depicting a series of operations for performing traffic inspection in a software defined network according to an example embodiment. That is, FIG. 3 depicts operations performed by SDN flow selection and TDA logic 300. With reference to FIG. 3, at 310, a security service is identified. The security service may be, e.g., IDS 190. At 312, SDN flow selection and TDA logic 300 determines whether the identified security service has sufficient capacity to take on new traffic or flow analysis or inspection. Where appropriate, and in the context of "escalation," SDN flow selection and TDA logic 300 may be configured to prioritize analysis or inspection, i.e., cause a given security applicant 190 to analyze or inspect one flow over another flow. This is one way in which security appliance 190 can be reconfigured in response to one or more indicators that suggest the presence of malware in a selected flow.

At 314, SDN flow selection and TDA logic 300 identifies candidate flows for inspection. And at 316, one or more of those candidate flows is selected for inspection. As indicated by 318, operations 314 and 316 may be considered as a single operation. Further details regarding how flows might be selected for analysis are provided herein below.

At 320, SDN flow selection and TDA logic 300 is configured to communicate with an SDN controller, e.g., SDN controller 180, to cause the SDN controller to redirect the selected flow or make a copy of the selected flow for inspection by the security device or appliance.

As noted, SDN flow selection and TDA logic 300 identifies candidate flows and selects flows for inspection, as indicated by operation 318. There are multiple ways in which this selection process might be implemented. One option is to monitor the type of application that is the subject of the flow. That is, certain applications may be known to be more susceptible to carrying malware. As such, those applications could be targeted for selection. Flow selection may also be based on a given user. User information may be obtained, for example, from ISE 198. That is, certain users might have a reputation for being subjected to malware, or even being a source of malware. Flows associated with such users could be targeted.

IP addresses, layer 2 addresses, email addresses, or any combination thereof to create a network tuple, can also be used as a basis to select a given flow to inspect. In addition, new flows can be targeted more than existing flows. That is, newly established flows from one switch port to another switch port can be targeted for inspection.

Figure 4:
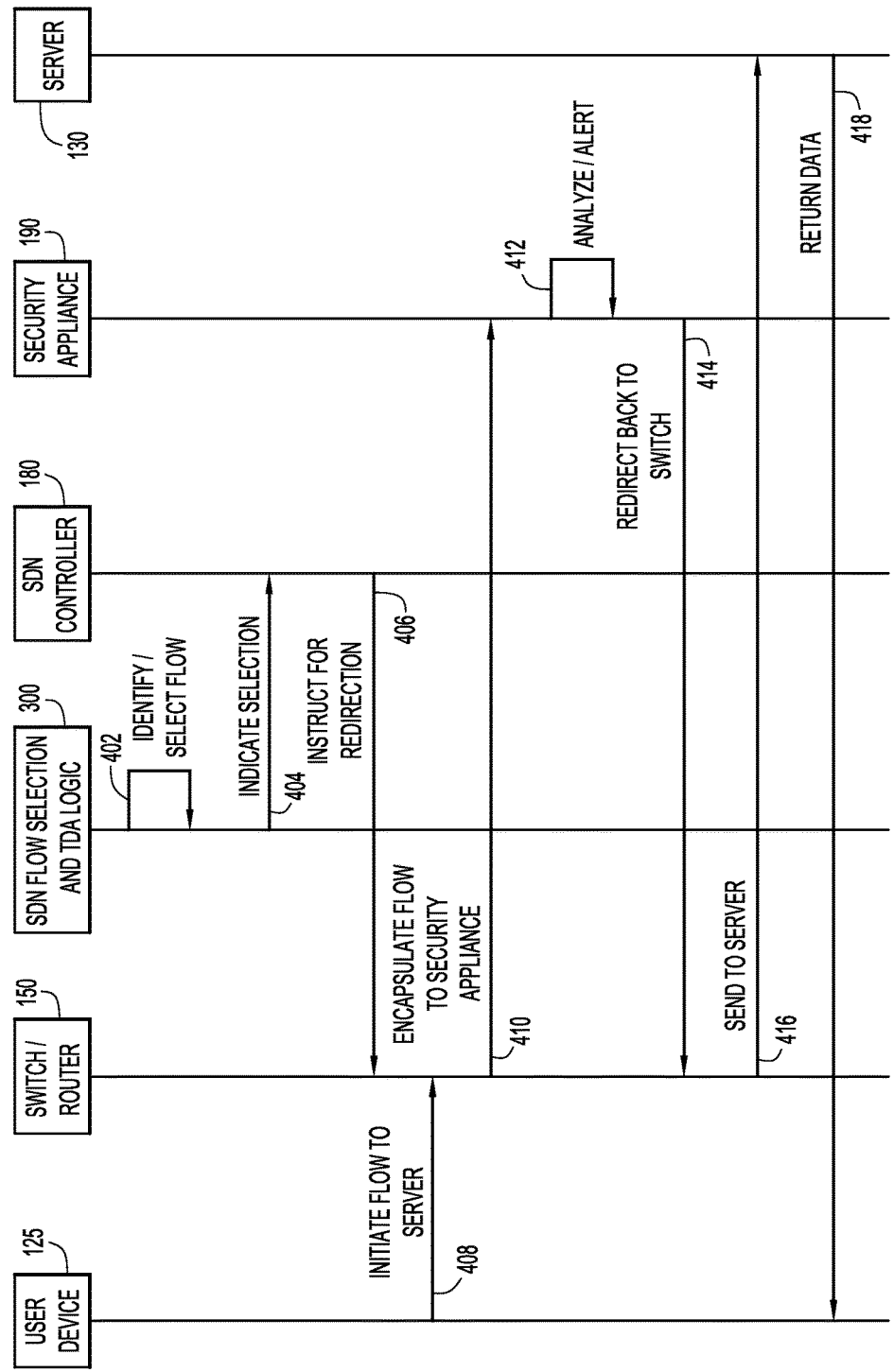
FIGS. 4 and 5 are example ladder diagrams depicting a series of operations to implement traffic inspection in a software defined network according to an example embodiment.
Figure 5:
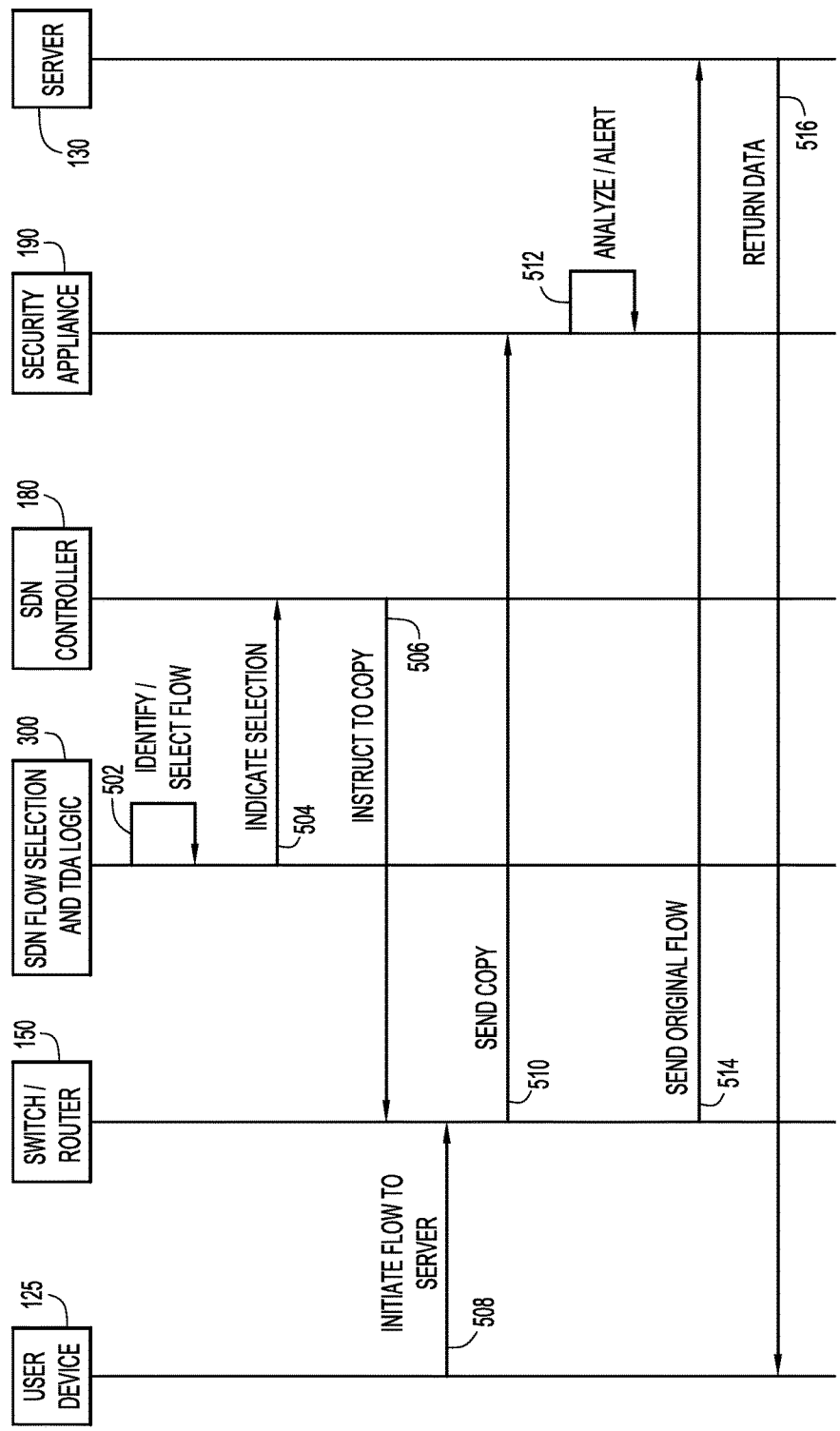

FIGS. 4 and 5 are example ladder diagrams depicting a series of operations to implement traffic inspection in a software defined network according to an example embodiment. FIG. 4 depicts example operations where a selected flow is redirected to a security device for inspection, whereas FIG. 5 depicts example operations where a selected flow is copied and the resulting copy is forwarded to a security device for inspection.

Referring first to FIG. 4, the same network components depicted in FIG. 1 are also depicted at the top of FIG. 4. That is, user device 125, switch/router 150, SDN flow selection and TDA logic 300, SDN controller 180, security service appliance 190 and server 130 are shown as being part of an overall process to enable traffic within a network to be selectively inspected.

At 402, SDN flow selection and TDA logic 300 identifies candidates flows and selects at least one such flow for inspection. At 404, SDN flow selection and TDA logic 300 notifies SDN controller 180 of the selection. SDN controller 180, at 406, instructs switch/router 150 to redirect the selected flow. Such redirection can be effected via encapsulation. It is noted that the OpenFlow communication protocol/standard may also be employed to effect redirection. At 408, user device 125 sends a flow toward switch/router 150, i.e., the selected flow. It is noted that operation 408 could have occurred before any of operations 402-406. At 410, switch/router 150 causes the selected flow to be encapsulated such that the flow is redirected to security device 190. At security device 190, the flow is subjected to inspection as indicated by 412. An alert can be raised, a notification can be sent, and/or information can be logged in accordance with the particular security device functionality. The flow can also be blocked if so desired. At 414, as a result of the encapsulation to effect the redirection, the flow is redirected back to switch/router 150, whereupon, at 416, the flow is sent to server 130 as was originally intended. At 418, server 130 responds to user device 125 by sending appropriate data in connection with the flow.

Those skilled in the art will appreciate that, although FIG. 4 depicts inspection of a flow coming from user device 125, a flow originating from server 130 can be inspected in the very same way.

Reference is now made to FIG. 5, which depicts an embodiment wherein a copy of a selected flow is forwarded to a security appliance. At 502, SDN flow selection and TDA logic 300 identifies candidates flows and selects at least one such flow for inspection. At 504, SDN flow selection and TDA logic 300 notifies SDN controller 180 of the selection. SDN controller 180, at 506, instructs switch/router 150 to copy the selected flow. Copying may be implemented using, among other approaches, switch port analyzer (SPAN), remote SPAN (RSPAN), Encapsulated RSPAN (ERSPAN), or OpenFlow, for example. At 508, user device 125 sends a flow toward switch/router 150, i.e., the selected flow. At 510, after making a copy of the flow, switch/router 150 sends the copy to security device 190. At security device 190, the flow is subjected to inspection as indicated by 512. An alert can be raised, a notification can be sent, and/or information can be logged in accordance with the particular security device functionality. Meanwhile at 514, the original flow is sent from switch/router 150 to server 130 as was originally intended. At 516, server 130 responds to user device 125 by sending appropriate data.

Those skilled in the art will appreciate that, although FIG. 5 depicts inspection of a flow coming from user device 125, a flow originating from server 130 can be inspected in the very same way, i.e., by copying and forwarding the resulting copy of the flow from server 130 to the security device 190.

As mentioned above, embodiments described herein also contemplate escalating the type of inspection that is performed by a security appliance 190. Escalation may also include having one or more security appliances 190 analyze additional/different flows. Escalation may be triggered in accordance with an embodiment by monitoring selected indicators (sometimes considered "weak" indicators, and generally also referred to herein as "indicators of compromise") and determining that those indicators (or at least one of them) indicate the presence of malware in a given flow being analyzed. Such weak indicators of malware might come from any of a variety of sources, including low-severity Intrusion Prevention System (IPS) rules (such as direct observation of a SQL injection attempt), analysis of NetFlow® (such as a side channel observation of a potential stealthy command and control), non-network-based systems such as server logs, and non-information technology-based inputs such as current events, human resources, a managerial request, and industry compliance factors. In the context of escalation, SDN flow selection and TDA logic 300 can instruct security appliance 190 to apply a particular appropriate profile (e.g., a set of rules) to that inspection. SDN flow selection and TDA logic 300 can be further configured to pass an indication of the appropriate inspection profile in-band as part of the encapsulation in use or use other methods, e.g., by using a VLAN associated with a desired inspection profile or through the use of an API to communicate desired inspection tasks.

SDN flow selection and TDA logic 300 may be configured to target a particular user device 125 or server 130 through any number of identifier information including, but not limited to, email address, IP address (both IPv4 and IPv6), Ethernet or Wi-Fi® MAC address, a network five tuple (source IP address, destination IP address, source port, destination port, protocol), or application type, such as those used by Open AppID or NBAR2-based Application Visibility and Control (AVC).

When SDN flow selection and TDA logic 300 requests an action, the acting entity (e.g., switch/router 150) may return either an indication that the request was fulfilled, or an indication that it could not be fulfilled. In the case where the request is fulfilled, an identifier unique within the scope of the acting entity may be returned and associated with the request.

In the exception case where a request cannot be fulfilled, the acting entity may provide a reason code and detailed information where available. For instance, if the acting entity cannot satisfy the request because a network link was congested, or a network device is down, this information may be passed on to SDN flow selection and TDA logic 300 so that alternate actions, if available, can be taken. For instance, another switch could be requested to make a copy of or redirect the selected flow.

In the case where an exception occurs later, the acting entity may so note and communicate such status to SDN flow selection and TDA logic 300 as appropriate. For example, if the acting entity returns an indication that a copy can be fulfilled, but then it later transpires that some change in network conditions makes it impossible to continue copying, the acting entity notifies SDN flow selection and TDA logic 300 of this change. This notification may occur either by SDN flow selection and TDA logic 300 polling the acting entity or by the acting entity notifying SDN flow selection and TDA logic 300 asynchronously.

The acting entity may not immediately know if it can satisfy the request. For example, internal mechanisms of the acting entity may process requests asynchronously to API requests. In such a case, the acting entity may return a unique identifier, as explained above, and when the status of the request becomes available, SDN flow selection and TDA logic 300 is notified. An alternative implementation is an API that blocks until the status is known.

Thus, SDN flow selection and TDA logic 300 and the acting entity (again, e.g., a switch 150) work together to determine the most appropriate inspection system (security appliance) to which the inspection target (selected flow) should be directed. This is done by considering inspection capacity, path capacity, current load and topology, and/or inspection capability. Selection may also be performed by an analyst, SDN controller 180, or a security management device or service.

In one possible implementation, SDN flow selection and TDA logic 300 requests, after receiving a notification from security appliance 190 that a selected flow contains malware, that traffic to a vulnerable port on given addresses be blocked. Optionally, SDN flow selection and TDA logic 300 can indicate the duration that the blocking is to take place.

Mitigations (e.g., blocking) requested by SDN flow selection and TDA logic 300 may be tracked, so that an administrator can determine which mitigations are in effect.

At a later time, after vulnerable software has been upgraded, SDN flow selection and TDA logic 300 may request that the mitigations be removed. Alternatively, the mitigation may lapse after the duration indicated by SDN flow selection and TDA logic 300 has passed (in cases where a duration is indicated). Otherwise, the mitigations will remain in place.

A destination address that is blocked could be external, as well as being inside of perimeter 110. Blocking an external address is done to prevent access to a botnet command and control server on the Internet, for example.

NetFlow is also operational with the embodiments described herein. In this context, switches or routers 150 are configured to export NetFlow to a collector (not shown), such that the flows include information elements relevant to security.

More specifically, SDN flow selection and TDA logic 300 may indicate to, e.g., SDN controller 180 that NetFlow, with a particular set of information elements, should be sent to a particular NetFlow collector. SDN controller 180 "discovers" which of the switches and routers 150 under its control has the NetFlow export capability. SDN controller 180 then turns on NetFlow on each of those network elements, applying the appropriate configuration. If a network element cannot provide a particular NetFlow information element that was requested, then that element may be omitted. Routers and switches 150 then export NetFlow to the collector as originally requested by SDN flow selection and TDA logic 300.

A variation of the foregoing is targeted NetFlow, in which SDN flow selection and TDA logic 300 may request that NetFlow be exported for a particular target device. In this case, SDN flow selection and TDA logic 300 may provide the IP address of a target device to SDN controller 180, along with the requested information elements and the NetFlow collector to which flow records are to be sent. SDN controller 180 then determines the appropriate network element that can act as NetFlow exporter, using techniques similar to those for determining an appropriate security appliance 190.

In an implementation SDN flow selection and TDA logic 300 can also request that particular traffic be routed through a security device or appliance such as a Denial of Service (DoS) scrubber, Firewall, IPS, Web Security Appliance (WSA) or other enforcement point. The security device can detect and drop DoS traffic, or force protocol conformance (in the Firewall case), or apply other enforcement techniques. It may be appropriate to use service insertion or service chaining.

The instant embodiments can also be configured to quarantine an endpoint device (user device 125, server 130) by restricting its traffic so that it can only communicate with a remediation server (not specifically shown, but could be one of servers 130), using, e.g., layer 2 techniques to divert traffic to that server. A remediation server typically runs third party software that remediates particular applications or operating systems. SDN offers flexibility in how quarantine can be done. It can be used to enable a network-layer quarantine, in which the remediation server can be remote, even potentially in a cloud. It also allows for more general containment mechanisms, in which a predefined policy can be selectively applied to a particular target device. This could include tagging the flow or traffic that originates with a particular device as being suspicious, using Security Group Tags (SGTs) or Source Group Tags (SGTs, again).

Figure 6:
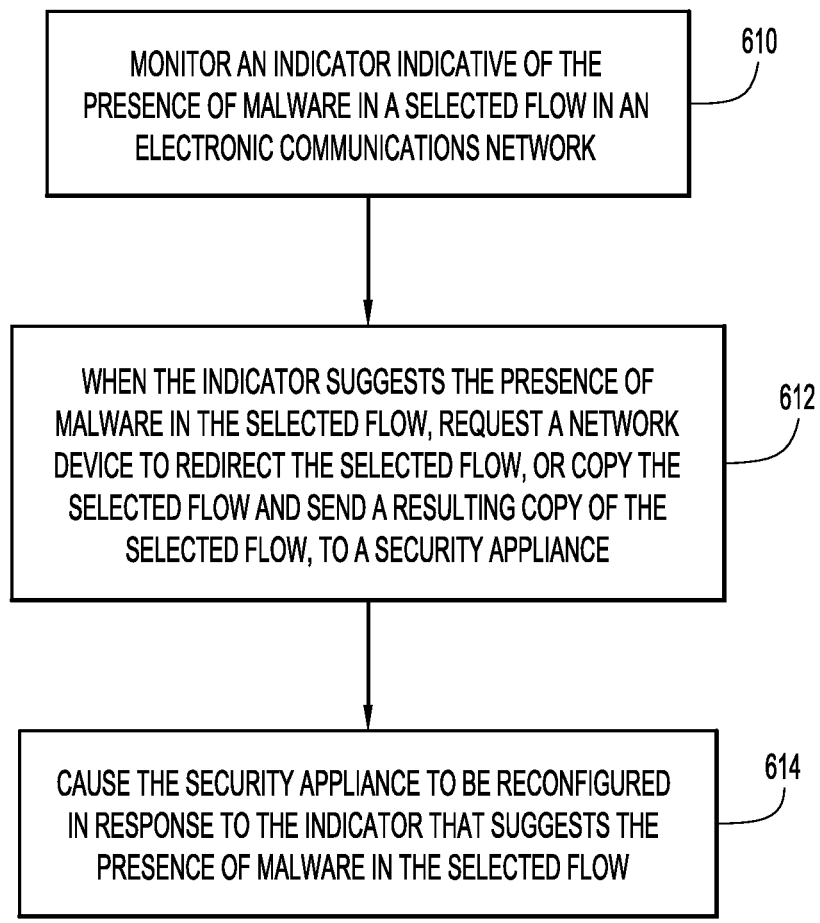
FIG. 6 is an example flow chart depicting another series of operations for performing traffic inspection in a software defined network according to an example embodiment.

FIG. 6 is an example flow chart depicting another series of operations for performing traffic inspection in a software defined network according to an example embodiment. At 610, a plurality of indicators (or, at least one indicator) indicative of the presence of malware in a selected flow in an electronic communications network is monitored. At 612, when the plurality of indicators (or indicator) suggests the presence of malware in the selected flow, a network device is requested to copy the selected flow and send a resulting copy of the selected flow to a security appliance. The selected flow can alternatively (or also) be redirected to the security appliance. At 614, the security appliance is caused to be reconfigured in response to the plurality of indicators (or indicator) that suggest the presence of malware in the selected flow.

Figure 7:
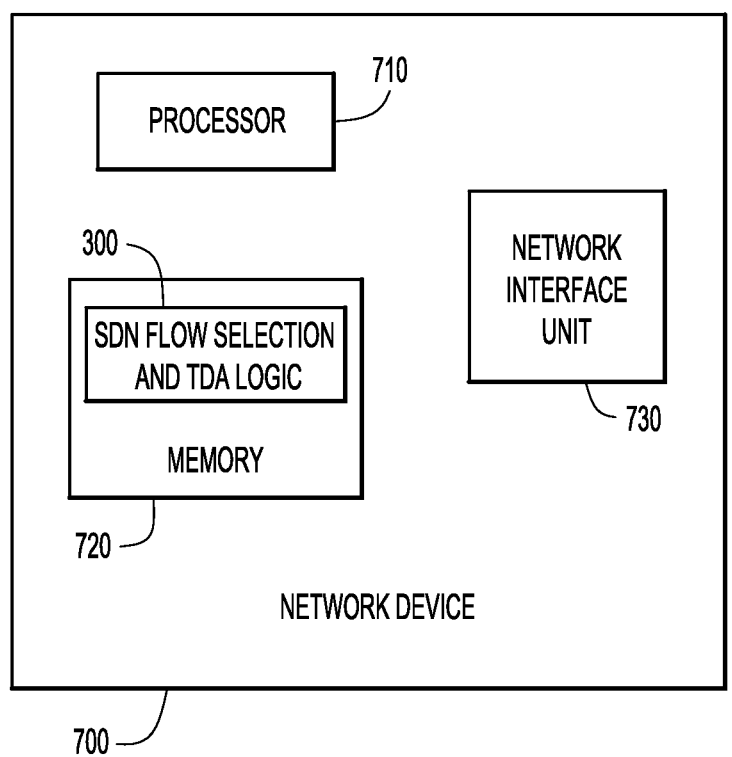
FIG. 7 depicts a block diagram of a network device on which SDN flow selection and TDA logic may be hosted according to an example embodiment.

FIG. 7 depicts a block diagram of a network device 700 on which SDN flow selection and TDA logic 300 may be hosted according to an example embodiment.

Such a network device includes a processor 710, memory 720 and a network interface unit 730. Processor 710 may be configured to perform the functions of flow selection and TDA logic 300 (i.e., the operations depicted in FIG. 3), among other functions. Memory 720 is configured to store a variety of data and software instructions including flow selection and TDA logic 300. Network interface unit 730 may include one or more ports or network interface cards via which the network device 700 can communicate with network components such as SDN controller 180 and switches/routers 150, among other components. Those skilled in the art will appreciate that flow selection and TDA logic 300 can be implemented together or separately and/or on the same or different hosts, and/or in the same or different locations.

Processor 710 may be, for example, a microprocessor or microcontroller that executes instructions for implementing the processes described herein. Memory 720 may comprise read only memory (ROM), random access memory (RAM), magnetic disk storage media devices, optical storage media devices, flash memory devices, electrical, optical, or other physical/tangible (e.g., non-transitory) memory storage devices. Thus, in general, memory 720 may comprise one or more tangible (non-transitory) computer readable storage media (e.g., a memory device) encoded with software comprising computer executable instructions and when the software is executed (by processor 710) is operable to perform the operations described herein.

In summary, the embodiments described herein are configured to facilitate the detection of malware in a software defined networking-enabled network by inspecting traffic showing indicators of compromise that would otherwise go uninspected, and using SDN to route or copy the sampled traffic to an inspection device. The sampling process can ensure that communication from each endpoint is inspected at some time, thus making it probable that infections will be detected. The foregoing embodiments are also configured to monitor indicators (indicators of compromise) that are indicative of the presence of malware in a selected flow. When the indicators suggest the presence of malware a network device is requested to copy (or redirect) the selected flow and send a resulting copy of the selected flow to a security appliance. The security appliance is also caused to be reconfigured in response to the indicators that suggest the presence of malware in the selected flow. Advantages of implementing an approach as that described herein enables inspection of otherwise un-inspected traffic and inspecting traffic with a reasonable degree of suspicion that it is compromised. High utilization of inspection resources can be obtained and the approach is topology independent of the location of inspection services. Embodiments described herein also enable a feedback mechanism in that as SDN flow selection and TDA logic 300 determines to escalate inspection through more in depth inspection of a given selected or through inspection of other flows, a probability of identifying and stopping malware is increased.

The above description is intended by way of example only. Various modifications and structural changes may be made therein without departing from the scope of the concepts described herein and within the scope and range of equivalents of the claims.

What is claimed is:

1. A method comprising:
monitoring an indicator indicative of a presence of malware in a selected flow in a local area network;
when the indicator suggests the presence of malware in the selected flow, requesting a network device to redirect the selected flow, or to copy the selected flow and send a resulting copy of the selected flow, to a security appliance, wherein the requesting comprises sending a message to a software defined network controller that is configured to control the network device; and
causing the security appliance to be reconfigured in response to the indicator when the indicator suggests the presence of malware in the selected flow, by supplying an indication of an inspection profile to the security appliance by using a virtual local area network (VLAN) associated with a desired inspection profile, wherein the selected flow would otherwise go uninspected.

2. The method of claim 1, wherein the indicator includes at least one of a SQL injection attempt, server logs, a current event, a human resource event, an industry compliance factor or a user request.

3. The method of claim 1, further comprising receiving a message from the network device indicating that a request to copy or to redirect the selected flow cannot be fulfilled.

4. The method of claim 1, further comprising receiving a message from the network device indicating that the network device can no longer copy or redirect the selected flow.

5. The method of claim 1, further comprising selecting, from among a plurality of security appliances, the security appliance to which the resulting copy of the selected flow is to be sent or the selected flow is to be redirected based on a capacity of the security appliance.

6. The method of claim 1, further comprising, in response to results of analysis of the selected flow, causing the security appliance to be further reconfigured.

7. The method of claim 1, further comprising, in response to results of analysis of the selected flow, requesting the network device to redirect another selected flow, or to copy another selected flow and to send a copy the another selected flow, to the security appliance or another security appliance.

8. The method of claim 1, wherein monitoring comprises monitoring a domain name system (DNS) server.

9. The method of claim 1, wherein the method is performed, at least in part, by an Application Policy Infrastructure Controller Enterprise Module (APIC-EM).

10. An apparatus comprising:
a network interface unit configured to enable communications via a local area network;
a memory configured to store logic instructions; and
at least one processor, when executing the logic instructions, is configured to:
monitor an indicator indicative of a presence of malware in a selected flow in the local area network;
when the indicator suggests the presence of malware in the selected flow, request a network device to redirect the selected flow, or to copy the selected flow and send a resulting copy of the selected flow, to a security appliance, wherein the request is performed by sending a message to a software defined network controller that is configured to control the network device; and cause the security appliance to be reconfigured in response to the indicator when the indicator suggests the presence of malware in the selected flow, by supplying an indication of an inspection profile to the security appliance by using a virtual local area network (VLAN) associated with a desired inspection profile, wherein the selected flow would otherwise go uninspected.

11. The apparatus of claim 10, wherein the indicator includes at least one of a SQL injection attempt, server logs, a current event, a human resource event, an industry compliance factor or a user request.

12. The apparatus of claim 10, wherein the processor, when executing the logic instructions, is further configured to receive a message from the network device indicating that a request to redirect or to copy the selected flow cannot be fulfilled.

13. The apparatus of claim 10, wherein the processor, when executing the logic instructions, is further configured to receive a message from the network device indicating that the network device can no longer redirect or copy the selected flow.

14. The apparatus of claim 10, wherein the processor, when executing the logic instructions, is further configured to select, from among a plurality of security appliances, the security appliance to which the redirected flow or resulting copy of the selected flow is to be sent based on a capacity of the security appliance.

15. The apparatus of claim 10, wherein the processor, when executing the logic instructions, is further configured to, in response to results of analysis of the selected flow, cause the security appliance to be further reconfigured.

16. The apparatus of claim 10, wherein the processor, when executing the logic instructions, is further configured to, in response to results of analysis of the selected flow, request the network device to redirect another selected flow, or to copy another selected flow and to send a copy the another selected flow, to the security appliance or another security appliance.

17. A non-transitory tangible computer readable storage media encoded with instructions that, when executed by at least one processor, is configured to cause the processor to:

monitor an indicator indicative of a presence of malware in a selected flow in a local area network;

when the indicator suggests the presence of malware in the selected flow, request a network device to redirect the selected flow, or to copy the selected flow and send a resulting copy of the selected flow, to a security appliance, wherein the request is performed by sending a message to a software defined network controller that is configured to control the network device; and cause the security appliance to be reconfigured in response to the indicator when the indicator suggests the presence of malware in the selected flow, by supplying an indication of an inspection profile to the security appliance by using a virtual local area network (VLAN) associated with a desired inspection profile, wherein the selected flow would otherwise go uninspected.

18. The non-transitory tangible computer readable storage media of claim 17, wherein, when the instructions are executed, the at least one processor is configured to receive a message from the network device indicating that a request to redirect the selected flow or to copy the selected flow cannot be fulfilled.

19. The non-transitory tangible computer readable storage media of claim 17, wherein, when the instructions are executed, the at least one processor is configured to receive a message from the network device indicating that the network device can no longer redirect the selected flow or to copy the selected flow.

20. The non-transitory tangible computer readable storage media of claim 17, wherein, when the instructions are executed, the at least one processor is configured to, in response to results of analysis of the selected flow, cause the security appliance to be further reconfigured.

* * * * *